United States Patent [19]
Mears et al.

[11] Patent Number: 5,430,294
[45] Date of Patent: Jul. 4, 1995

[54] STARING FOCAL PLANE ARRAY ARCHITECTURE FOR MULTIPLE APPLICATIONS

[76] Inventors: Christopher L. Mears, 3812 Carrizo Dr., Plano, Tex. 75074; Terence J. Murphy, 6663 Hunters Ridge Dr., Dallas, Tex. 75248

[21] Appl. No.: 230,043
[22] Filed: Apr. 19, 1994
[51] Int. Cl.$^6$ .................. G01J 1/02; G01J 1/42; H01L 31/02
[52] U.S. Cl. .................. 250/332; 250/370.08
[58] Field of Search .......... 250/332, 338.4, 349, 250/370.08

[56] References Cited

U.S. PATENT DOCUMENTS

| | | | |
|---|---|---|---|
| 3,806,729 | 4/1974 | Caywood | 250/370.08 X |
| 3,808,435 | 4/1974 | Bate et al. | 250/332 |
| 4,660,066 | 4/1987 | Reid | 250/332 X |
| 4,849,634 | 7/1989 | Riedl | 250/332 |
| 5,272,535 | 12/1993 | Elabd | 358/213.11 |
| 5,293,035 | 3/1994 | Lyons et al. | 250/332 |

*Primary Examiner*—Constantine Hannaher
*Assistant Examiner*—Edward J. Glick
*Attorney, Agent, or Firm*—Rene' E. Grossman; Richard L. Donaldson

[57] ABSTRACT

A staring focal plane architecture that utilizes a frame buffer to meet the requirements of multiple applications. The frame buffer can be implemented in the array unit cell or external to the unit cell. The frame buffer allows windowing or outputting subsections of the array. Multiple windows per frame can also be outputs. Other features such as electronic dezoom are also supported. The frame buffer allows a high degree of flexibility and in the case where the frame buffer is external to the cell high dynamic range.

12 Claims, 1 Drawing Sheet

1

STARING FOCAL PLANE ARRAY ARCHITECTURE FOR MULTIPLE APPLICATIONS

BACKGROUND OF THE INVENTION

1. Field of the Invention

This invention relates to an infra red focal plane staring array which is capable of multiple applications and, more specifically, to a novel architecture for such focal plane staring arrays.

2. Brief Description of the Prior Art

Focal plane staring arrays are generally composed of a matrix of plural detector elements, each of the detector elements having an associated circuit with a capacitor which is charged in proportion to the amount of energy impinging thereon. Signals indicative of the charges on each of the capacitors in the array are read out, generally in serial manner, so that one detector element is being read out while the capacitor associated with the next detector element is being charged up. The capacitors are then again charged in accordance with the amount of energy impinging thereon and later read out. This procedure is repeated, generally on a timed basis. The outputs from the capacitors are therefore not simultaneously available or are not available in any manner such that the signals from predetermined ones of the detectors can be selected for operation on those signals only in some predetermined manner.

For advanced applications of staring focal plane arrays, multiple features are desired. For reduced data rates, the ability to "window" or output only a subarea of the focal plane array or only predetermined ones of the detectors of the focal plane array is advantageous. Multiple windowing or the ability to output upon request multiple subareas of the array is advantageous for tracking multiple targets in a large field of view. Another feature that is desirable is electronic dezoom to reduce data rates on large targets. Electronic dezoom combines adjacent detectors into one. That is, for a 2:1 dezoom, four detectors are combined into one. A 256×256 array becomes a 128×128 array. For missile seeker and other applications, it is desirable to change these features at will so that the sensor can adapt to the scenario at hand. For long wavelength infrared applications, high dynamic range is required which means large charge storage capacity for each detector is necessary. Some applications require that the signals from all detectors be integrated and simultaneously sampled to allow for accurate tracking and location of targets. This mode is typically referred to as a snapshot mode. Other applications allow the detector signals to be sampled at different times. Typically, this is performed by staggering the sampling across the array performing an electronic scan of the detectors.

SUMMARY OF THE INVENTION

In accordance with the present invention, there is provided a single architecture capable of supporting plural modes of operation including all of the above described modes.

Briefly, there is provided a staring focal plane array architecture which uses a frame buffer to store detector samples. The frame buffer is basically one sample and hold circuit associated with each detector element. Once the samples from the focal plane detector are transferred to and stored in the frame buffer, this transfer being accomplished either serially, in parallel or some combination thereof, the data stored in the frame buffer can be read out in any order or any portion thereof can be read out to allow windowing. The samples are output in a non-destructive manner and retained until the next set of samples from the focal plane array is about to be transferred so that multiple areas can be output to allow multiple windows. By reading multiple detectors into a single frame buffer element or multiple frame buffer elements connected in parallel, electronic dezoom results. In the case of a large number of detectors, where the frame buffer cannot be built with high producibility, the frame buffer can be built in a separate silicon chip but will be in close mechanical proximity to the chip containing the detectors and be electrically connected to this chip.

DESCRIPTION OF THE PREFERRED EMBODIMENT

Figure 1:
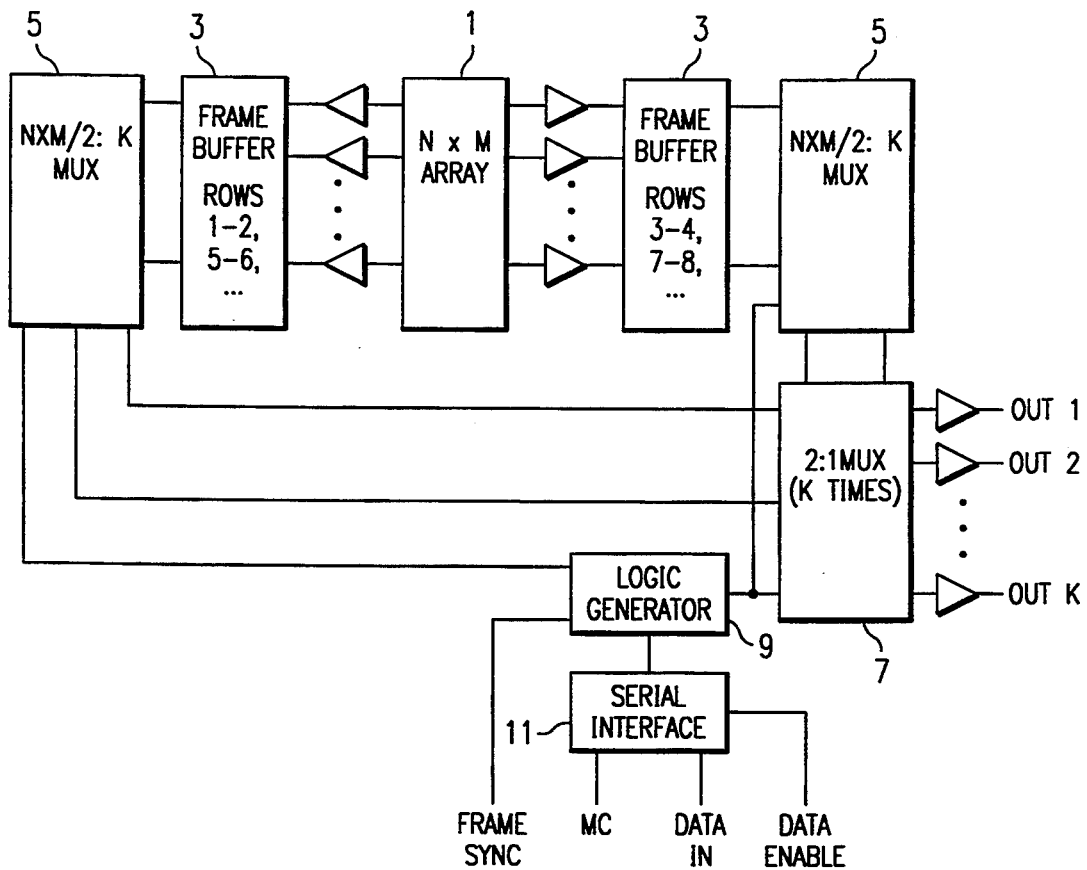
FIG. 1 is a block diagram of a staring focal plane array architecture in accordance with the present invention utilizing a frame buffer external to the unit cell.

The frame buffer architecture in accordance with the present invention can be implemented in several ways. Referring first to FIG. 1, there is shown a block diagram for a focal plane array that utilizes a frame buffer external to the focal plane array and the unit cell including the capacitor associated therewith. In FIG. 1, there is shown a focal plane array which receives energy, preferably but not limited to energy in the infrared frequency range, composed of a matrix of M by N detector elements 1, the number of such detector elements depending upon the ultimate requirements of the system. Each of the detector elements has an associated unit cell composed of a transistor and a capacitor of standard construction to store a charge thereon proportional to the amount of energy impinging upon the associated detector element. A frame buffer 3 is provided which has a plurality of storage locations corresponding to the number of detector elements in the focal plane array, one such storage location for each of the elements of the focal plane array. The frame buffer as shown in FIG. 1 has been split into two sections (though the number of sections is optional and can be one or more) to allow centering of the detector array within an integrated circuit including the focal plane array, buffer frame, if desired, other and circuitry such as, for example, multiplexers which are discussed hereinbelow. This splitting is not necessary to implement this architecture. The frame buffer has been split into groups of two to allow an easy implementation of a 2:1 dezoom in each direction. FIG. 1 also shows the detector interface circuit as what is commonly referred to as a direct inject circuit. This is not necessary for utilizing the frame buffer circuit.

The frame buffer is arranged so that the voltages stored on each of the capacitors of the focal plane array are read out to each section of the frame buffer from alternate pairs of rows of detectors of the array, these voltages being stored in the associated storage location in the frame buffer when the readout function is implemented. For example, rows and 2 of the detector array 1 can be read out to the frame buffer on one side of the array, rows 3 and 4 of the detector array can be read out to the frame buffer on the other side of the array, rows 5 and 6 of the detector array can be read out to the frame buffer on the one side of the array and so forth in this alternating manner. Upon implementation of the readout function, the detector elements of the focal plane array will again be charged up and the data stored in the frame buffer at that time will be read out via N:M multiplexers 5 to avoid the necessity of the same number of readout lines from the frame buffer as there are storage elements therein in standard manner. The digital logic generator 9 selects the data in the frame buffer to be transferred by said multiplexer in response to external inputs 11. The readouts of the N:M multiplexers are fed to a second multiplexer 7 from which the data is read out to a utilization device of predetermined type for desired utilization. After the readout from the frame buffers, the cycle is repeated whereby the new information in the focal plane array is read out into the frame buffer as described above. In this way, all of the information in the focal plane array is simultaneously available in the frame buffer. Accordingly, any portion of the information stored in the frame buffer becomes accessible immediately as opposed to the prior art arrangement discussed hereinabove.

Temporal signal processing can be performed by charge sharing the newest detector sample with the sample that is already in the buffer instead of entirely replacing the buffer sample. This may be desired to accumulate multiple detector samples into one, providing an increase in signal to noise ratio at a low output data rate.

Figure 2:
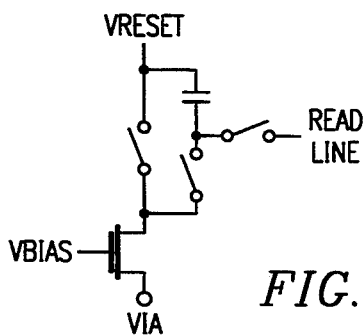
FIG. 2 is a block diagram of a staring focal plane array architecture implemented within the unit cell.

FIG. 2 shows an implementation of the frame buffer where the frame buffer is implemented within the unit cell. An extra capacitor is included in the unit cell to allow the sampling and storage of the detector signal. In this case, the dynamic range is reduced by approximately a factor of two. Since the circuit elements must be contained within the detector element size, the integration capacitor will be approximately one half the size it would have been if the frame buffer were external to the unit cell. Due to this constraint, a switch has been included to allow both capacitors to be connected in parallel so that, for applications not requiring windowing, the extra dynamic range can be utilized.

For non-destructive reading of the sample and hold circuit, which is required for multiple windowing, a buffer amplifier will also be required in the unit cell. This will cause the integration capacitor to be even smaller.

Simultaneous sampling of the detectors can be performed and these samples used to fill the frame buffer or samples can be obtained staggered in time to fill the frame buffer. This latter approach results in potentially higher duty cycle, but for some applications, is undesirable due to accurate location of targets.

Though the invention has been described with respect to specific preferred embodiments thereof, many variations and modifications will immediately become apparent to those skilled in the art. It is therefore the intention that the appended claims be interpreted as broadly as possible to include all such variations and modification.

We claim:

1. A staring focal plane array system which comprises:
   (a) a staring focal plane array having a plurality of detector elements and a plurality of charge receiving elements, one said charge receiving element associated with each of said detector elements;
   (b) a frame buffer having a plurality of storage elements, one said storage element associated with each said detector element, said frame buffer including two sections, each of said sections disposed on an opposing side of said focal plane array;
   (c) a multiplexer for serially transferring data from a selected subset of said plurality of said storage elements; and
   (d) means to periodically transfer data from each of said charge receiving elements to the associated storage element in said frame buffer.

2. The system of claim 1 wherein said focal plane array is responsive to infrared energy.

3. The system of claim 1 further including digital logic means for selecting the data in said frame buffer transferred by said multiplexer in response to external inputs.

4. The system of claim 3 wherein said focal plane array is responsive to infrared energy.

5. The system of claim 3 wherein said focal plane array and said frame buffer are disposed on a single semiconductor chip.

6. The system of claim 5 wherein said focal plane array is responsive to infrared energy.

7. The system of claims 5 wherein said detector elements are disposed in a plurality of rows, alternating ones of said rows being coupled to a different one of said two sections of said frame buffer.

8. The system of claim 7 wherein said focal plane array is responsive to infrared energy.

9. The system of claim 1 wherein said focal plane array and said frame buffer are disposed on a single semiconductor chip.

10. The system of claim 9 wherein said focal plane array is responsive to infrared energy.

11. The system of claim 9 wherein said detector elements are disposed in a plurality of rows, alternating ones of said rows being coupled to a different one of said two sections of said frame buffer.

12. The system of claim 11 wherein said focal plane array is responsive to infrared energy.

* * * * *